C. W. BOWEN.
HEN'S NEST.
APPLICATION FILED MAY 18, 1917.

1,286,924.

Patented Dec. 10, 1918.

INVENTOR
Charles W. Bowen.

WITNESSES
Guy M. Spring
J. O'Connell

BY Richard B. Owen.

ATTORNEY

UNITED STATES PATENT OFFICE.

CHARLES W. BOWEN, OF PLAINFIELD, WISCONSIN.

HEN'S NEST.

1,286,924.   Specification of Letters Patent.   Patented Dec. 10, 1918.

Application filed May 18, 1917. Serial No. 169,546.

*To all whom it may concern:*

Be it known that I, CHARLES W. BOWEN, a citizen of the United States, residing at Plainfield, in the county of Waushara and State of Wisconsin, have invented certain new and useful Improvements in Hens' Nests, of which the following is a specification.

This invention relates to certain new and useful improvements in hens' nests and the primary object of the invention is to provide a device of character mentioned including a receptacle having a nest suspended therein, and means for conveying the eggs deposited in the nest into the receptacle, whereby the eggs will be kept in a clean and sanitary condition, and the hen prevented from setting or otherwise rendering the eggs unfit for culinary purposes.

Another object of the invention is to provide novel means for automatically removing the egg from the nest and depositing the same in the receptacle in which the nest is suspended.

A further object resides in providing the receptacle with an auxiliary chamber to receive the eggs, and in equipping the chamber with a hinged closure having cushioning means depending therefrom.

Other objects as well as the nature, characteristic features and scope of the invention will be more readily understood from the following description and drawings in which, Figure 1, is a top plan view of my invention.

Figure 1:
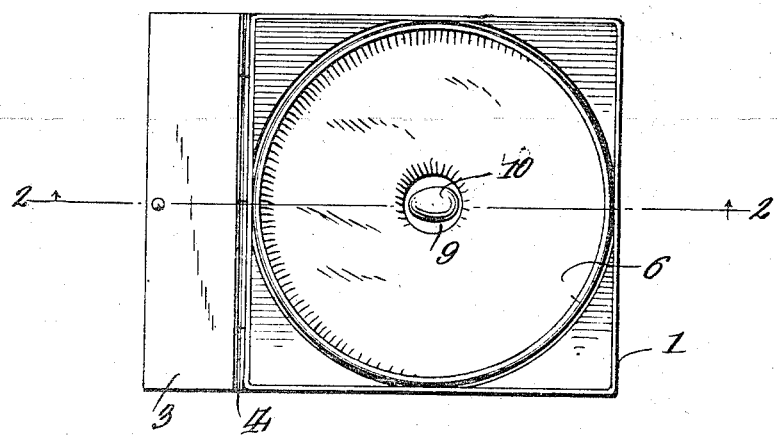
Figure 2:
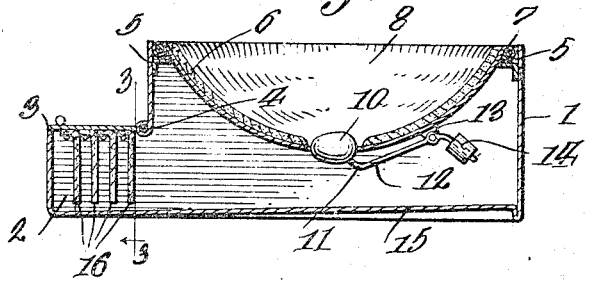
Fig. 2, is a longitudinal sectional view taken on the line 2—2 of Fig. 1.
Figure 3:
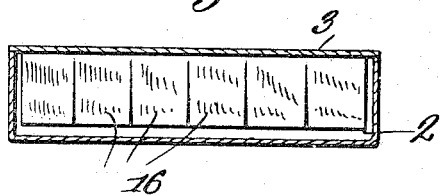
Fig. 3, is a sectional view taken on the line 3—3 of Fig. 2.

In the drawings wherein is illustrated the preferred embodiment of my invention, the numeral 1 indicates an outer receptacle which may be of any suitable material and of any desired configuration. However, in the present and preferred form the casing 1 is substantially rectangular in shape, and has the lower portion of one side extended to provide the receiving chamber 2, to which access may be had by means of the door 3 which is hingedly connected to the main body of the receptacle as indicated at 4. Interiorly secured to the sides of the receptacle 1 are a plurality of angular supporting strips 5 which are positioned a certain distance below the top edges of the said sides and are adapted for a purpose to be hereinafter set forth. The nest proper as indicated at 6 is preferably made of metal and is of a semi-circular formation in cross section, having its edges rolled to embrace a circular metal ring 7. The interior of the nest as indicated at 8 is covered with hemp, felt or even common straw. As shown in Fig. 2 the rolled edges of the nest 6 are supported by the angular strips 5 in such manner that the bottom of the nest is disposed in close proximity to the inclined bottom of the receptacle 1. The nest 6 is further provided with the centrally disposed opening 9 into which a nest egg 10 is normally adapted to protrude, said nest egg providing a substantial closure for the opening. The nest egg 10 is attached to the upturned end 11 of a rod 12 which is pivotally connected to the nest at one side of the opening as indicated at 13, the free end of said rod being downwardly curved and equipped with a weight 14, said weight being sufficiently heavy to counterbalance the nest egg 10, so as to normally hold the latter in position within the opening 9.

The bottom of the nest as indicated at 15 inclines downwardly toward the receiving chamber 2 and if desired may be covered with straw or other suitable material for the purpose of cushioning the descent of an egg from the nest 6. Secured to the under surface of the door 3 and depending therefrom are a plurality of spaced fabric strips 16 which are adapted to check the progress of the eggs along the inclined bottom 16 to prevent forcible contact of the eggs with the wall of the receiving chamber 2. The strips 16 are slit vertically at spaced intervals so that the eggs may pass between the strips.

In the practical use of my improved nest an egg when deposited therein will, due to the shape of the nest, be guided toward the central opening 9 and on to the nest egg 10. The weight of the deposited egg coupled with that of the nest egg 10 will be sufficient to overbalance the weight 14 and will cause the nest egg to move downwardly toward the bottom of the receptacle 1. In this instance it will be noted that the nest egg 10 serves as a medium for transferring the deposited egg from the nest 6 onto the inclined bottom 15, along which the egg is adapted to roll until checked by the depending strip 16 positioned in the receiving chamber 2. The egg may then be removed from the receptacle by way of the door 3.

I claim:—

1. A device of the character described including an outer casing having an inclined bottom leading to a receiving chamber, a nest suspended in said casing and having an opening therein, a closure for said receiving chamber, a plurality of cushioning strips carried by said closure and depending therefrom, and said strips being slit vertically at spaced intervals.

2. A device of the character described including an outer casing having an inclined bottom and leading to a receiving chamber, a nest suspended in said casing, and having an opening therein, a closure for said receiving chamber, and a plurality of slit cushioning strips carried by said closure and depending therefrom.

In testimony whereof I affix my signature in presence of two witnesses.

CHARLES W. BOWEN.

Witnesses:
O. A. CROWELL,
ORIN L. HETZEL.